United States Patent
Inoue

(10) Patent No.: US 7,249,528 B2
(45) Date of Patent: Jul. 31, 2007

(54) HUB UNIT WITH SENSOR

(75) Inventor: Masahiro Inoue, Nara (JP)

(73) Assignee: JTEKT Corporation, Osaka (JP)

( * ) Notice: Subject to any disclaimer, the term of this patent is extended or adjusted under 35 U.S.C. 154(b) by 0 days.

(21) Appl. No.: 10/500,363

(22) PCT Filed: May 16, 2003

(86) PCT No.: PCT/JP03/06106

§ 371 (c)(1),
(2), (4) Date: Jun. 28, 2004

(87) PCT Pub. No.: WO03/097381

PCT Pub. Date: Nov. 27, 2003

(65) Prior Publication Data

US 2005/0016296 A1    Jan. 27, 2005

(30) Foreign Application Priority Data

May 17, 2002 (JP) ............................ 2002-142413
May 17, 2002 (JP) ............................ 2002-142415

(51) Int. Cl.
*G01L 1/26* (2006.01)
(52) U.S. Cl. ............................................. 73/862.392
(58) Field of Classification Search ............. 73/11.07, 73/862.631, 862.044, 862.541, 862.393, 73/862.392; 384/448
See application file for complete search history.

(56) References Cited

U.S. PATENT DOCUMENTS 5,004,980 A * 4/1991 Ida et al. ................ 324/166
5,714,880 A * 2/1998 Miyazaki et al. .......... 324/173
5,942,891 A * 8/1999 Miyazaki et al. .......... 324/173
6,471,407 B1 * 10/2002 Katano ..................... 384/448
6,619,102 B2 * 9/2003 Salou et al. .............. 73/11.07
6,672,681 B1 * 1/2004 Moretti et al. ............ 301/109
6,792,680 B2 * 9/2004 Mazur et al. ........... 29/894.361
2003/0011358 A1 * 1/2003 Karpinski ................. 324/173
2004/0123677 A1 * 7/2004 Omata .................... 73/862.324

FOREIGN PATENT DOCUMENTS

| JP | 47-17484 | 9/1972 |
| JP | 60-102536 | 6/1985 |
| JP | 2-253009 | 10/1990 |
| JP | 3-209016 | 9/1991 |
| JP | 3-273948 | 12/1991 |
| JP | 8-152370 | 6/1996 |
| JP | 9-292294 | 11/1997 |
| JP | 10-73501 | 3/1998 |
| JP | 2001-296175 | 10/2001 |

* cited by examiner

Primary Examiner—Max Noori
(74) Attorney, Agent, or Firm—Oblon, Spivak, McClelland, Maier & Neustadt, P.C.

(57) ABSTRACT

A hub unit having a sensor comprises a hub unit 1 having a wheel-side raceway member 4, a body-side raceway member 5 and two rows of rolling bodies 6, and a sensor device 2 provided on the hub unit 1. The body-side raceway member 5 has a cylindrical portion 16 and a flange portion 17 provided with an insertion hole for a bolt for fastening the hub unit 1 to a vehicle body. The sensor device 2 has a magnetic sensor 31 supported by a support member 33 fixed to the flange portion 17 and serving as a displacement sensor for detecting variations in the distance between the sensor and the cylindrical portion 16. A magnetized portion 34 is provided on the cylindrical portion 16 at a location opposed to the sensor.

9 Claims, 4 Drawing Sheets

HUB UNIT WITH SENSOR

TECHNICAL FIELD

The present invention relates to hub units which have a sensor and which are each in the form of an assembly comprising a hub unit serving as a component of a motor vehicle and a sensor device joined to the hub unit for detecting various items of data as to the motor vehicle.

BACKGROUND ART

Since various items of data are required for controlling motor vehicles, it has been proposed to provide a sensor on a hub unit comprising a wheel-side raceway member to which a wheel is to be attached, a body-side raceway member to be fixed to the vehicle body, and two rows of rolling bodies arranged between the two raceway members.

For example, the publication of JP-A No. 1991-209016 discloses a sensor-equipped hub unit wherein an annular support member is attached to the inner end face of a body-side raceway member and provided with a stain sensor.

The control means recently in use for motor vehicles include drive force control means not permitting pinning of the drive wheels when the vehicle is started or accelerated, and braking force control means for suppressing lateral skidding for cornering, in addition to the ABS control means (antilock brake system). To ensure more accurate control, it has become important to detect data which is usable effectively for these modes of control.

In view of the above situation, the present inventor has conceived the idea of improving the control of vehicles by accurately measuring the ground contact load acting on the tire (wheel).

However, since the conventional hub unit having a sensor is adapted to measure the stain of the annular support member, the ground contact load determined from the strain involves a great error, so that the hub unit has the problem that the ground contact load can not be obtained with high accuracy from the measurement of the strain sensor.

An object of the present invention is to provide a hub unit having a sensor and adapted to determine ground contact loads with high accuracy.

DISCLOSURE OF THE INVENTION

The present invention provides a hub unit having a sensor and comprising a hub unit having a wheel-side raceway member for a wheel connectable thereto, a body-side raceway member to be attached to a vehicle body and two rows of rolling bodies arranged between the two raceway members, and a sensor device provided on the hub unit, the body-side raceway member having a cylindrical portion and a flange portion provided with an insertion hole for a bolt for fastening the hub unit to the vehicle body, the hub unit being characterized in that the sensor device has a sensor for detecting the amount of deformation of the flange portion of the body-side raceway member and processing means for determining a ground contact load from the output of the sensor.

With the hub unit having a sensor and embodying the invention, the flange portion of the body-side raceway member deforms greatly in accordance with variations in the ground contact load on the wheel, and the amount of deformation is detected by the sensor. Since the ground contact load is determined from the output of the sensor, the ground contact load can be detected with high accuracy from the force acting on the hub unit.

The ground contact load on the tire thus obtained is used as slip ratio substituting data for ABS control and is used also for controlling the drive force or brake force, thus contributing to improvements in the accuracy of vehicle control.

For example, the flange portion of the body-side raceway member has a base end part provided with a curved surface, and the sensor is a strain sensor provided on the base end part having the curved surface.

The stain gauge to be used is, for example, an electric strain gauge which varies in resistance value with the deformation of the portion to be detected. In addition to the strain gauge, also usable is an optical fiber strain gauge. Usually a plurality of strain gauges are used as affixed to the required location on the flange base end part with an adhesive. The ground contact load acting on each tire varies with variations in the velocity of the running vehicle or with the alterations of the posture of the vehicle. At this time, the flange portion of the body-side raceway member connected to the vehicle body with bolts deforms with the ground contact load, and a strain and stress corresponding to the ground contact load occur in the flange base end part having a curved surface to which the strain gauges are affixed. Accordingly, the ground contact load can be determined from the strain obtained by the strain sensor. In affixing the strain gauges, the four strain gauges can be so affixed as to provide a Wheatstone bridge and obtain a fourfold output.

The strain of the body-side raceway member can be measured directly and accurately by the strain sensor as provided on the curved base end part of the flange of the body-side raceway member, so that the force exerted by the ground on the body-side raceway member, i.e., the ground contact load, is detectable accurately. Moreover, there is no need to use a member for supporting the strain sensor on the body-side raceway member, and the ground contact load measuring sensor device can be installed on the vehicle without increasing the number of parts or without necessitating an additional space for the installation.

Alternatively, the sensor is a displacement sensor supported by a support member fixed to one of the cylindrical portion of the body-side raceway member and the flange portion thereof for detecting the distance between the displacement sensor and the other portion.

The ground contact load acting on each tire varies with variations in the velocity of the running vehicle or with the alterations of the posture of the vehicle. At this time, the flange portion of the body-side raceway member connected to the vehicle body with bolts deforms relative to the cylindrical portion. Accordingly, variations in the ground contact load appear as variations in the amount of deformation of the flange portion relative to the cylindrical portion, and these variations are measured as variations in the distance between the cylindrical portion (or the flange portion) and the displacement sensor by the sensor fixed to the flange portion (or the cylindrical portion). Variations in the ground contact load can conversely be calculated from variations in this distance. In this way, the displacement of the flange portion of the body-side raceway member is detected by the displacement sensor relative to the cylindrical portion thereof, so that the amount of deformation of the body-side raceway member can be measured directly and accurately. The force exerted by the ground on the body-side raceway member, i.e., the ground contact load, is therefore detectable with high accuracy.

The displacement sensor is not limited particularly in type, nor is the support member limited specifically in structure.

The displacement sensor may be a magnetic sensor provided on a forward end of the support member for detecting variations in the distance from the displacement sensor to an outer periphery of the cylindrical portion of the body-side raceway member, and a magnetized portion is provided on the other portion of the body-side raceway member which portion is not provided with the support member, at a location opposed to the sensor. Alternatively, the displacement sensor may be a displacement sensor of the inductance type provided on the forward end of the support member for detecting variations in the distance from the displacement sensor to the other portion of the body-side raceway member which portion is not provided with the support member. For example, the support member extends axially of the hub unit and has a base end fixed to the flange portion of the body-side raceway member, and the displacement sensor may be a magnetic sensor provided on the forward end of the support member for detecting variations in the distance from the displacement sensor to the outer periphery of the cylindrical portion of the body-side raceway member, with a magnetized portion provided on the cylindrical portion of the body-side raceway member at a location opposed to the sensor. Alternatively, the support member extends radially of the hub unit and has a base end fixed to the cylindrical portion of the body-side raceway member, and the displacement sensor may be a displacement sensor of the inductance type provided on the forward end of the support member for detecting variations in the distance from the displacement sensor to the flange portion of the body-side raceway member.

Preferably, the support member for supporting the displacement sensor has a contact surface in contact with the vehicle body (e.g., a suspension) in the axial direction, and the flange portion of the body-side raceway member also has a contact surface in contact with the vehicle body in the axial direction. More preferably, these contact surfaces are positioned in the same plane.

BEST MODE OF CARRYING OUT THE INVENTION

Embodiments of the invention will be described below with reference to the drawings.

Figure 1:
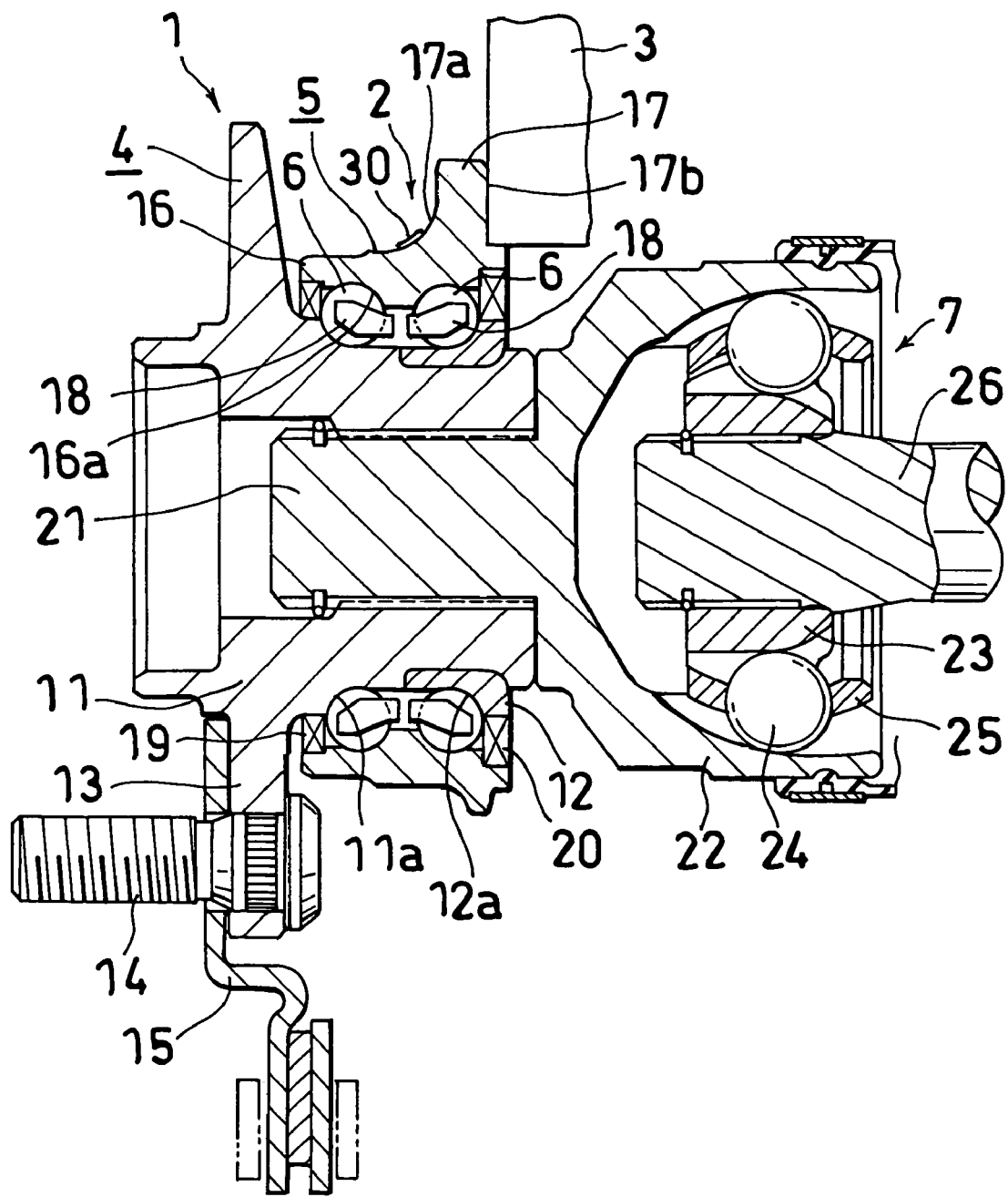
FIG. 1 is a view in vertical section showing a first embodiment of hub unit having a sensor according to the invention.
Figure 2:
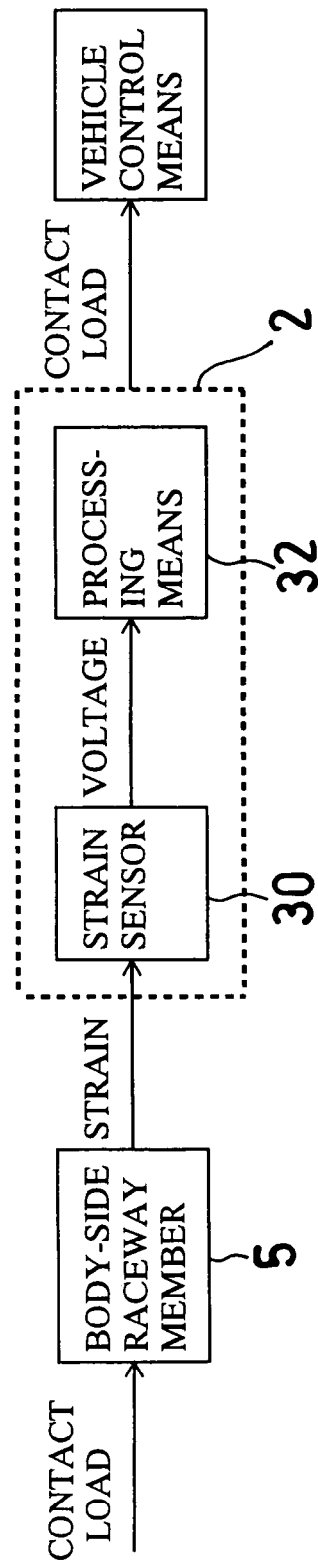
FIG. 2 is a block diagram of a sensor device of the hub unit of the first embodiment.

FIGS. 1 and 2 show a first embodiment of hub unit having a sensor according to the invention. In the following description, the left- and right-hand sides of FIG. 1 will be referred to as the "left" and "right," respectively. The left side is the outside of the vehicle, and the right side is the inside of the vehicle.

With reference to FIG. 1, the hub unit having a sensor of the first embodiment comprises a hub unit 1 having a wheel-side raceway member 4 to which a wheel (not shown) is to be attached, a body-side raceway member 5 to be fixed to a vehicle body 3 and two rows of rolling bodies 6 arranged between the two raceway members 4, 5, and a sensor device 2 provided on at least one of the two raceway members 4, 5 of the hub unit 1.

The hub unit 1 is of the type for use on drive wheels of motor vehicles and is coupled to a constant velocity joint 7.

The wheel-side raceway member 4 comprises a hollow hub wheel 11, and an inner ring 12 fixedly fitted around a right end portion of the hub wheel 11. The hub wheel 11 has a flange 13 close to the left end thereof. An inner raceway 11*a* is formed on an outer peripheral portion of the hub wheel 11 between the flange 13 and the inner ring 12. The inner ring 12 has an inner raceway 12*a* in parallel to the inner raceway 11*a*. The flange 13 of the hub wheel 11 is fixedly provided with a plurality of bolts 14 for fixing a wheel. A disk rotor 15 of a disk brake device is attached to the flange.

The body-side raceway member 5 has the function of the outer ring (fixed ring) of a bearing, and has a cylindrical portion 16 provided with two outer raceways 16*a* on the inner periphery thereof, and a flange portion 17 provided at the right end of the cylindrical portion 16 and attached by bolts (not shown) to a suspension (vehicle body) 3. Bolt holes (not shown) are formed in the flange portion 17. The flange portion 17 has a base end part 17*a* integral with the cylindrical portion 16 and provided with a curved surface which is smoothly continuous with the left side surface of the flange portion 17 and with the outer peripheral surface of right part of the cylindrical portion 16. An outer portion of right side of the flange portion 17 has an annular cutout part 17*b*, the bottom face (orthogonal to the axial direction) of which serves as a face for attaching the hub unit 1 to the vehicle body 3.

The two rows of rolling bodies 6 are arranged as held by respective retainers 18 between the raceways 11*a*, 12*a* and 16*a* of the two raceway member 4, 5. Seal devices 19, 20 are provided respectively between the left end of the body-side raceway member 5 and the hub wheel 11 and between the right end of the body-side raceway member 5 and the right end of the inner ring 12.

The constant velocity joint 7, which is of the bar field type, comprises a rod portion 21 fixedly fitted in the hub wheel 11, an outer ring 22 integral with the right end of the rod portion 21 and having a concave surface, an inner ring 23 opposed to the outer ring 22 and fixed to a drive shaft 26 connected to a differential unit (not shown), and balls 24 and a retainer 25 arranged between the two rings 22, 23.

The sensor device 2 comprises a strain sensor 30 attached to the body-side raceway member 5, and means 32 (not shown in FIG. 1) for processing the output of the strain sensor 30.

The strain sensor 30 comprises a plurality of strain gauges for measuring the expansion or contraction of a material as variations in electrical resistance value, and is affixed to the curved base end part 17*a* of flange portion 17 of the body-side raceway member 5 with an adhesive. The base end part 17*a* is the greatest of all parts of the hub unit 1 in deformation. The provision of the strain gauge sensor to this part serves to minimize the influence of errors on the measurement.

With the hub unit described, a variation in the ground contact load on the tire produces a strain in the body-side raceway member 5 to vary the electrical resistance value of the strain senor 30, and this variation is output as converted to a variation in voltage as shown in FIG. 2. The processing means 32 of the sensor device 2 has stored therein an equation for calculating variations in the ground contact load from variations in the voltage. The processing means 32 determines the variation of ground contact load from the output of the strain sensor 30. The variation of ground contact load obtained is fed to vehicle control means to properly control the vehicle.

Figure 3:
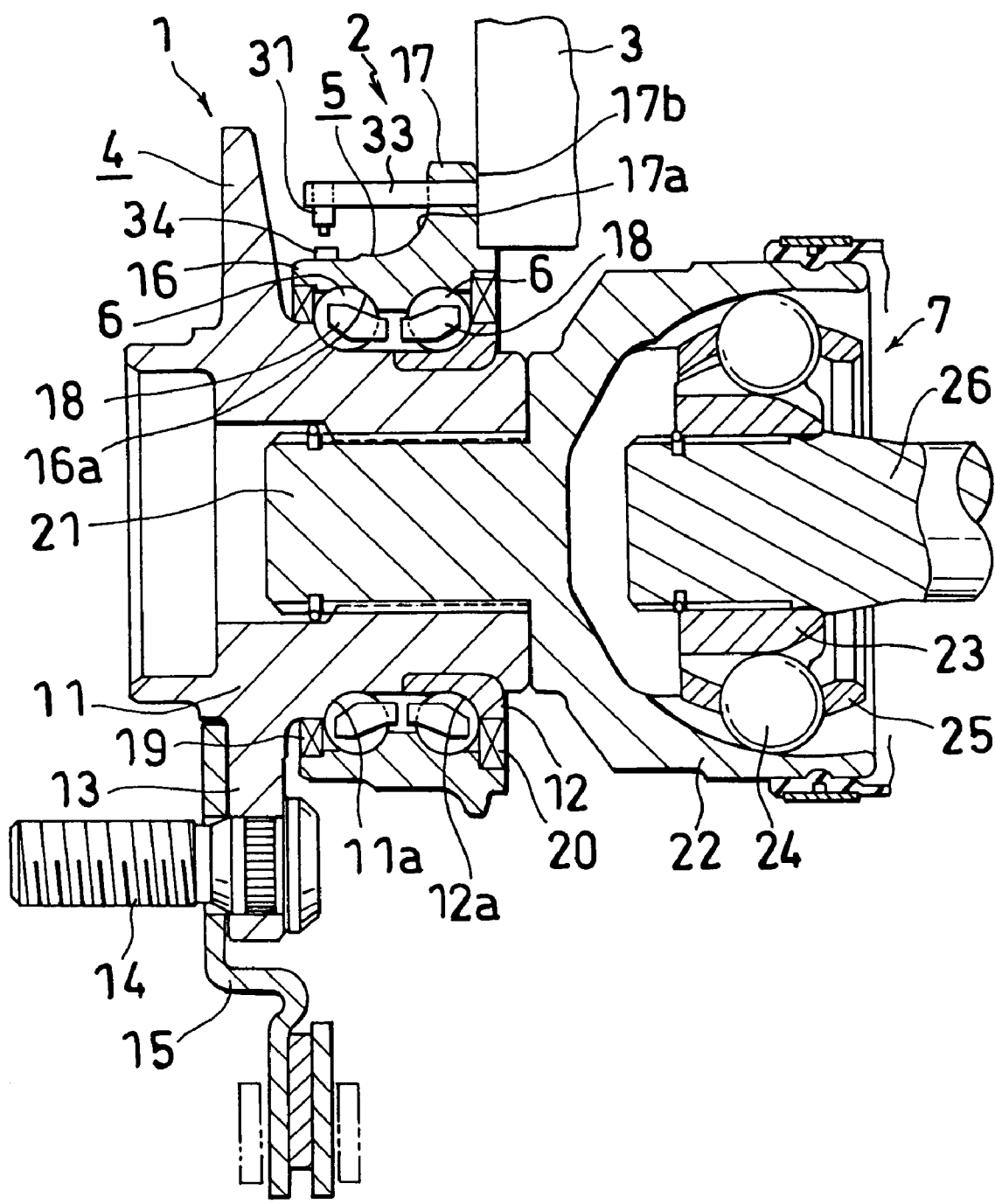
FIG. 3 is a view in vertical section showing a second embodiment of hub unit having a sensor according to the invention.

FIG. 3 shows a second embodiment of hub unit having a sensor according to the invention. The second embodiment differs from the first only in the sensor device. Throughout the drawings concerned, like parts are designated by like reference numerals and will not be described repeatedly.

Figure 5:
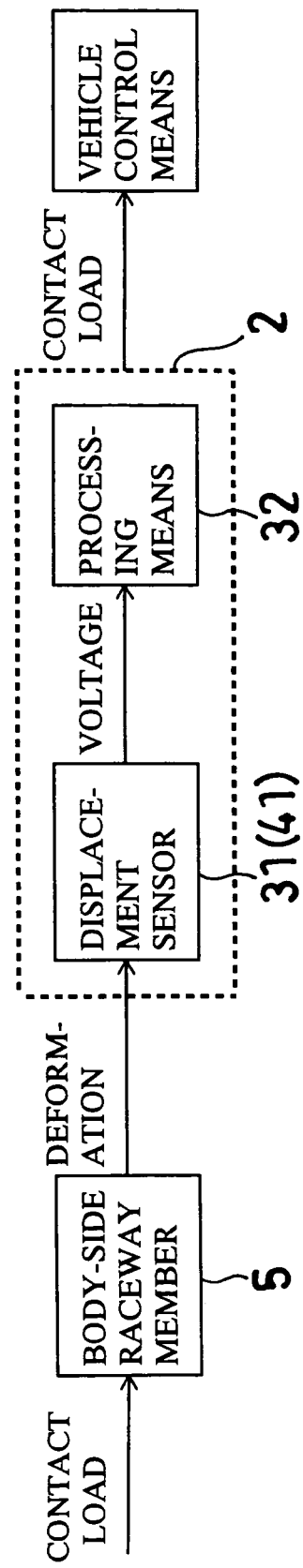
FIG. 5 is a block diagram of a sensor device for use in the hub units of the second and third embodiments.

FIG. 3 shows a sensor device 2 which comprises a displacement sensor 31 attached to the body-side raceway member 5, and means 32 (not shown in FIG. 3, see FIG. 5) for processing the output of the displacement sensor 31.

According to the embodiment, the displacement sensor 31 is a magnetic sensor and is supported by a support member 33 fixed to the flange portion 17 of the body-side raceway member 5. The support member 33 extends axially of the hub unit and has a base end fixed to the flange portion 17 of the body-side raceway member 5. The displacement sensor 31 is provided at the forward end of the support member 33. The cylindrical portion 16 of the raceway member 5 is provided with a magnetized portion 34 at a location opposed to the sensor 31. Thus, the magnetic sensor serving as the displacement sensor 31 is adapted to detect variations in the distance between the sensor and the outer periphery of the cylindrical portion 16 of the body-side raceway member 5.

With the hub unit described above, a variation in the ground contact load of the tire alters the angle made by the cylindrical portion 16 of the body-side raceway member 5 and the flange portion 17 thereof to vary the distance between the displacement sensor 31 and the magnetized portion 34. This varies the magnetic field set up by the magnetized portion 34, and the variation in the magnetic field is detected by the magnetic sensor 31 and output as a variation in voltage. The processing means 32 of the sensor device 2 has stored therein an equation for calculating variations in the ground contact load from variations in the distance output as variations in the voltage. The processing means 32 determines the variation of ground contact load from the output of the displacement sensor 31. The variation of ground contact load obtained is fed to vehicle control means to properly control the vehicle.

Figure 4:
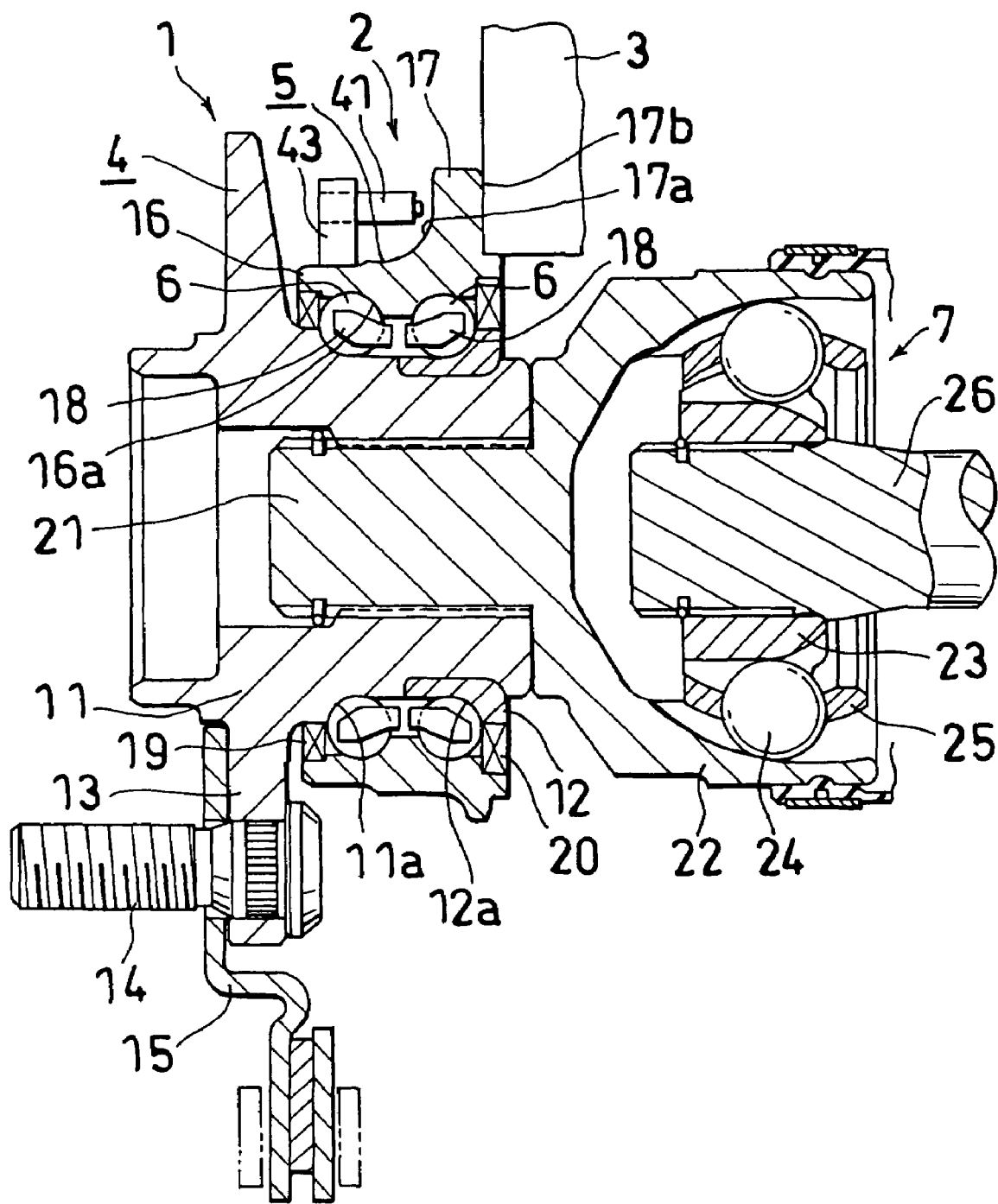
FIG. 4 is a view in vertical section showing a third embodiment of hub unit having a sensor according to the invention.

FIG. 4 shows a third embodiment of hub unit having a sensor according to the invention. The third embodiment differs from the second only in the sensor device. Throughout the drawings concerned, like parts are designated by like reference numerals and will not be described repeatedly.

The sensor device 2 of this embodiment comprises a displacement sensor 41 which is of the inductance type and is supported by a support member 43 fixed to the cylindrical portion 16 of the body-side raceway member 5. The support member 43 extends radially of the hub unit and has a base end fixed to an outer peripheral part of cylinder portion 16 of the raceway member 5. The displacement sensor 41 is provided at the forward end of the support member 43 and opposed to the left side surface of the flange portion 17 of the body-side raceway member 5. The displacement sensor 41 of the inductance type generates a high-frequency magnetic field from a coil incorporated therein and is adapted to detect variations in the inductance of the coil. The sensor utilizes the current to be induced in the metal portion to be detected when the metal portion approaches the high-frequency magnetic field, the dependence of this current on the distance between the coil and the portion to be detected, and variations in the inductance of the coil with the intensity of the current. Since the flange portion 17 of the body-side raceway member 5 is made of a metal, variations in the distance from the sensor to the left side surface of the flange portion 17 are detectable.

With the hub unit described above, a variation in the ground contact load of the tire alters the angle made by the cylindrical portion 16 of the body-side raceway member 5 and the flange portion 17 thereof to vary the distance between the displacement sensor 41 and the flange portion 17 of the raceway member 5. The variation in this distance is detected by the displacement sensor 41 of the inductance type, and output as a variation in voltage. The processing means 32 (see FIG. 5) of the sensor device 2 has stored therein an equation for calculating variations in the ground contact load from variations in the distance output as variations in the voltage. The processing means 32 determines the variation of ground contact load from the output of the displacement sensor 41. The variation of ground contact load obtained is fed to vehicle control means to properly control the vehicle.

INDUSTRIAL APPLICABILITY

The hub unit having a sensor and embodying the invention is used in place of the hub unit of a motor vehicle, whereby various items of data as to the motor vehicle are detectable to ensure improved control of the vehicle.

The invention claimed is:

1. A hub unit having a sensor, comprising:
a hub unit having a wheel-side raceway member for a wheel connectable thereto;
a body-side raceway member to be attached to a vehicle body and two rows of rolling bodies arranged between the two raceway members; and
a sensor device provided on the hub unit, the body-side raceway member having a cylindrical portion and a flange portion provided with an insertion hole for a bolt for fastening the hub unit to the vehicle body,
the hub unit having a sensor being characterized in that the sensor device has a sensor affixed to the curved base end part of the flange portion for detecting the amount of deformation of the location and processing means for determining a ground contact load from the output of the sensor.

2. A hub unit having a sensor according to claim 1 wherein the sensor is provided at a curved boundary surface between the outer peripheral part of the cylindrical portion of the body-side raceway member and the inside of the flange portion thereof.

3. A hub unit having a sensor according to claim 1 wherein the curved boundary surface is consecutive toward the inside of the flange portion of the body-side raceway member.

4. A hub unit having a sensor according to claim 1 wherein the sensor is affixed to the location with an adhesive.

5. A hub unit having a sensor according to claim 1 wherein the sensor is affixed to the curved boundary surface with an adhesive.

6. A hub unit having a sensor, comprising:
a hub unit having a wheel-side raceway member for a wheel connectable thereto;

a body-side raceway member to be attached to a vehicle body and two rows of rolling bodies arranged between the two raceway members; and a sensor device provided on the hub unit, the body-side raceway member having a cylindrical portion and a flange portion provided with an insertion hole for a bolt for fastening the hub unit to the vehicle body, the hub unit having a sensor being characterized in that the sensor device has a sensor for detecting the amount of deformation of the flange portion of the body-side raceway member and processing means for determining a ground contact load from the output of the sensor, wherein the sensor is a displacement sensor supported by a support member that extends axially from one of the cylindrical portion of the body-side raceway member and the flange portion thereof for detecting the distance between the displacement sensor and the other portion.

7. A hub unit having a sensor according to claim 6 wherein the displacement sensor is a magnetic sensor provided on a forward end of the support member for detecting variations in the distance from the displacement sensor to an outer periphery of the cylindrical portion of the body-side raceway member, and a magnetized portion is provided on the other portion of the body-side raceway member which portion is not provided with the support member, at a location opposed to the sensor.

8. A hub unit having a sensor according to claim 6 wherein the displacement sensor is a displacement sensor of the inductance type provided on a forward end of the support member for detecting variations in the distance from the displacement sensor to the other portion of the body-side raceway member which portion is not provided with the support member.

9. A hub unit having a sensor, comprising:

a hub unit having a wheel-side raceway member for a wheel connectable thereto;

a body-side raceway member to be attached to a vehicle body and two rows of rolling bodies arranged between the two raceway members; and a sensor device provided on the hub unit, the body-side raceway member having a cylindrical portion and a flange portion provided with an insertion hole for a bolt for fastening the hub unit to the vehicle body, the hub unit having a sensor being characterized in that the sensor device has a sensor for detecting the amount of deformation of the flange portion of the body-side raceway member and processing means for determining a ground contact load from the output of the sensor, wherein the sensor is a displacement sensor supported by a support member that extends radially from the cylindrical portion of the body-side raceway member for detecting the distance between the displacement sensor and the other portion.

* * * * *